United States Patent
Yoon et al.

(10) Patent No.: US 10,666,317 B2
(45) Date of Patent: May 26, 2020

(54) METHOD AND APPARATUS OF TRANSMISSION CONTROL FOR PROVIDING INTERNET SERVICE IN ACCESS NETWORK

(71) Applicant: KT CORPORATION, Gyeonggi-do (KR)

(72) Inventors: Kwangyeol Yoon, Seoul (KR); Jonghak Kim, Gyeonggi-do (KR); Nowook Park, Gyeonggi-do (KR); Hyung-Jin Park, Seoul (KR); Kyoung-Ju Lee, Seoul (KR); In-Taek Jeong, Daejeon (KR); Tae Woo Ha, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/317,781

(22) PCT Filed: Jul. 11, 2017

(86) PCT No.: PCT/KR2017/007398
§ 371 (c)(1),
(2) Date: Jan. 14, 2019

(87) PCT Pub. No.: WO2018/012846
PCT Pub. Date: Jan. 18, 2018

(65) Prior Publication Data
US 2019/0245579 A1    Aug. 8, 2019

(30) Foreign Application Priority Data

Jul. 14, 2016 (KR) .................. 10-2016-0089025
Sep. 8, 2016 (KR) .................. 10-2016-0115874

(51) Int. Cl.
*H04L 27/00* (2006.01)
*H04B 3/04* (2006.01)
(Continued)

(52) U.S. Cl.
CPC .............. *H04B 3/04* (2013.01); *H04B 3/32* (2013.01); *H04B 3/50* (2013.01)

(58) Field of Classification Search
CPC ........... H04B 3/04; H04B 3/50; H04L 1/0003; H04L 1/0071; H04L 5/0007; H04L 1/0009; H04L 27/0008
(Continued)

(56) References Cited

U.S. PATENT DOCUMENTS 6,035,029 A    3/2000  Little et al.
6,317,493 B1   11/2001 Little et al.
(Continued)

FOREIGN PATENT DOCUMENTS

JP    4650716 B2      3/2011
JP    2015-522962 A   8/2015
(Continued)

*Primary Examiner* — Zewdu A Kassa
(74) *Attorney, Agent, or Firm* — IP Legal Services, LLC

(57) ABSTRACT

Disclosed is a method for performing transmission frequency control for a subscriber line of a customer premise device by a transmission control apparatus in an access network structure in which at least one network management device and a plurality of customer premise devices are connected through a bundle cable including a plurality of subscriber lines. The transmission control method includes: setting a partial frequency band in an entire service frequency band provided by the subscriber line as a transmission frequency band of the customer premise device; and varying the transmission frequency band in the entire service frequency band when a triggering event occurs, in which
(Continued)

traffic of the customer premise device is transmitted and received in the transmission frequency band.

17 Claims, 22 Drawing Sheets

(51) Int. Cl.
  *H04B 3/32* (2006.01)
  *H04B 3/50* (2006.01)
(58) Field of Classification Search
  USPC .......................................... 375/295, 219, 316
  See application file for complete search history.

(56) References Cited

U.S. PATENT DOCUMENTS

| | | |
|---|---|---|
| 6,453,033 B1 | 9/2002 | Little et al. |
| 2004/0032902 A1* | 2/2004 | Koifman .................. H04L 5/06 |
| | | 375/222 |
| 2005/0034159 A1* | 2/2005 | Ophir .................. H04L 12/2801 |
| | | 725/78 |
| 2005/0174938 A1 | 8/2005 | Richardson et al. |
| 2013/0202293 A1 | 8/2013 | Boyd et al. |
| 2015/0146767 A1 | 5/2015 | Kerpez et al. |
| 2015/0326380 A1* | 11/2015 | Verbin .................. H04L 5/1438 |
| | | 370/252 |

FOREIGN PATENT DOCUMENTS

| | | |
|---|---|---|
| KR | 10-2007-0033716 A | 3/2007 |
| KR | 10-0875040 B1 | 12/2008 |
| KR | 10-1466187 B1 | 11/2014 |
| KR | 10-2016-0035960 A | 4/2016 |

* cited by examiner

METHOD AND APPARATUS OF TRANSMISSION CONTROL FOR PROVIDING INTERNET SERVICE IN ACCESS NETWORK

CROSS REFERENCE TO RELATED APPLICATIONS

This application is a National Stage Patent Application of PCT International Patent Application No. PCT/KR2017/007398 (filed on Jul. 11, 2017) under 35 U.S.C. § 371, which claims priority to Korean Patent Application Nos. 10-2016-0089025 (filed on Jul. 14, 2016) and 10-2016-0115874 (filed on Sep. 8, 2016), the teachings of which are incorporated herein in their entireties by reference.

TECHNICAL FIELD

The present invention relates to a method for reducing subscriber line-to-line crosstalk in an access network.

BACKGROUND ART

In recent years, as the giga Internet has been commercialized and expanded, the existing network device providing a high-speed Internet service of 100 Mbps level is being changed to a network device providing the gigabit Internet service. Giga-class Internet of 100 Mbps or more is commercially available and is provided to customers in earnest.

When using an optical cable or an unshielded twisted pair cable (UTP) 4 pair cable, it is possible to provide a 1 Gbps-class Internet service. However, it is difficult for a scheme using a UTP 2 pair cable or a telephone line to provide 1 Gbps-class Internet.

Unlike the optical cable, in a copper wire bundle cable environment, performance degradation occurs due to crosstalk in the same equipment or between equipments.

When a plurality of x digital subscriber line (xDSL) equipments shares a bundle cable, an influence on crosstalk increases and a performance degradation width increases.

Crosstalk occurs when the existing xDSL equipment and an equipment for providing the Giga Internet use the same frequency band. Particularly, due to characteristics of a copper wire bundle, inter-line crosstalk occurs, and as a result, when signals are transmitted to a plurality of lines, transmission performance deteriorates.

Thus, there is a need for a control and management technology for providing speeds suited to services subscribed to all subscribers in the presence of the crosstalk.

DISCLOSURE

Technical Problem

The present invention has been made in an effort to provide a method and an apparatus of transmission control, which may provide a high-speed Internet service to a subscriber by minimizing crosstalk between subscriber lines installed between a network management device and a customer premise device and maximally assuring a transmission speed of a subscribed product.

Technical Solution

An exemplary embodiment of the present invention provides a method for controlling transmission frequency for a subscriber line of a customer premise device by a transmission control apparatus in an access network structure in which at least one network management device and a plurality of customer premise devices are connected through a bundle cable including a plurality of subscriber lines. The method includes setting a partial frequency band in an entire service frequency band provided by the subscriber line as a transmission frequency band of the customer premise device and varying the transmission frequency band in the entire service frequency band when a triggering event occurs. Traffic of the customer premise device is transmitted and received in the transmission frequency band.

The setting a partial frequency band includes setting the transmission frequency band based on at least one of a contract transmission speed, a subscriber line state, and a traffic amount of the customer premise device.

When the traffic amount of the customer premise device satisfies the triggering event, the varying the transmission frequency band includes changing a size of the transmission frequency band.

The transmission control method may further include setting a default transmission frequency band for each contract transmission speed, in which the setting a default transmission frequency band includes obtaining a default frequency band of the customer premise device based on a subscribed product of the customer premise device and setting the obtained default frequency band in the customer premise device.

When the triggering event in which an adjacent subscriber line is changed from an unused state to a used state occurs, the varying the transmission frequency band includes changing a size of the default frequency band according to a transmission frequency band set in the adjacent subscriber line.

The transmission control method may further include dividing the entire service frequency band into a plurality of intervals. The setting a partial frequency band includes setting at least one interval among the plurality of intervals as the transmission frequency band, and the varying the transmission frequency band includes changing the interval set to the transmission frequency band among the plurality of intervals according to the triggering event.

The setting a partial frequency band includes setting the transmission frequency band by applying a low pass filter in which a first interruption frequency is set in the entire service frequency band, and when the traffic amount of the customer premise device increases to satisfy the triggering event, the varying the transmission frequency band includes increasing the size of the transmission frequency band by increasing the first interruption frequency to a second interruption frequency which is a high frequency.

The varying the transmission frequency band may include varying the transmission frequency band in the entire service frequency band when the triggering event occurs, and varying a transmission signal strength according to at least one of the traffic of the customer premise device, a usage state of an adjacent line, and a varying operation of the transmission frequency band.

Another exemplary embodiment of the present invention provides a method for controlling transmission for subscriber lines of a plurality of customer premise devices by a transmission control apparatus in an access network structure in which at least one network management device and a plurality of customer premise devices are connected through a bundle cable including a plurality of subscriber lines. The method includes receiving a network resource request from each of the plurality of customer premise devices, and setting a transmission frequency band for each of the plurality of customer premise devices.

The transmission frequency band of each customer premise device is a partial frequency band in an entire service frequency band. Traffic of each customer premise device is transmitted and received in the corresponding transmission frequency band.

The transmission control method may further include varying a transmission frequency band of a target customer premise device in the entire service frequency band when a frequency band change event occurs in the target customer premise device among the customer premise devices.

When a traffic amount of the target customer premise device increases to satisfy the frequency band change event, the varying a transmission frequency band includes increasing a size of the transmission frequency band by increasing an interruption frequency of a low pass filter set in the entire service frequency band.

The varying a transmission frequency band includes determining the transmission frequency band of the target customer premise device by referring to a transmission frequency band allocated to an adjacent subscriber line of the target customer premise device.

The setting a transmission frequency band includes setting the same transmission frequency band to each of the plurality of customer premise devices.

The setting a transmission frequency band includes determining the transmission frequency band of each customer premise device based on a frequency band allocation criterion corresponding to each of the plurality of customer premise devices, and the frequency band allocation criterion may include at least one of a contract transmission speed, a subscriber line state, and a traffic amount of each customer premise device.

Yet another exemplary embodiment of the present invention provides an apparatus for controlling traffic transmission for a subscriber line of a customer premise device. The apparatus includes a memory; and a processor performing a traffic transmission control operation by executing an instruction stored in or loaded to the memory, and the processor sets a partial frequency band in an entire service frequency band provided by the subscriber line as a transmission frequency band of the customer premise device when receiving a network resource request of the customer premise device, and varying the transmission frequency band in the entire service frequency band when a triggering event occurs. Traffic of the customer premise device is transmitted and received in the transmission frequency band.

The processor may set the transmission frequency band by applying a low pass filter in which a first interruption frequency is set in the entire service frequency band in the setting, and increase, when a traffic amount of the customer premise device increases to satisfy the triggering event, a size of the transmission frequency band by increasing the first interruption frequency to a second interruption frequency which is a high frequency in the varying.

The processor may obtain a default frequency band of the customer premise device based on a default transmission frequency band for each contract transmission speed and set the obtained default frequency band in the customer premise device, in the setting.

The processor may further perform varying a transmission signal strength according to at least one of the traffic of the customer premise device, a usage state of an adjacent line, and a varying operation of the transmission frequency band.

Advantageous Effects

According to exemplary embodiments of the present invention, it is possible to provide an environment capable of providing an optimized high-speed Internet service by variably setting a transmission frequency band according to a subscribed product and a traffic usage amount in an environment where crosstalk exists between subscriber lines.

MODE FOR INVENTION

Figure 1:
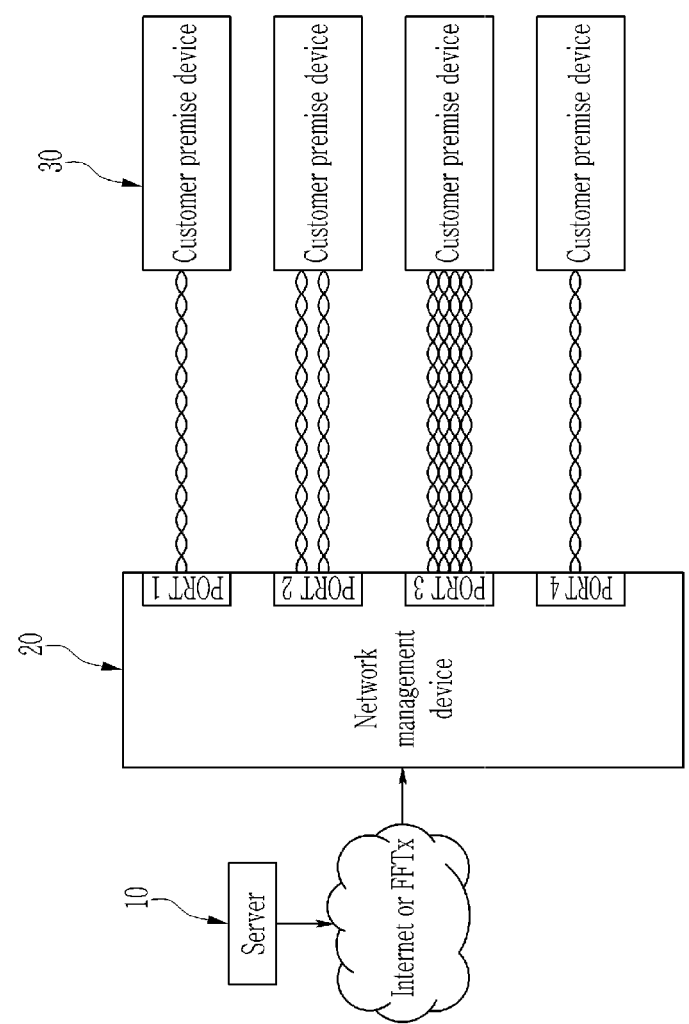
FIG. 1 is a diagram illustrating a structure of an access network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification Throughout the specification, unless explicitly described to the contrary, the word "comprise" and variations such as "comprises" or "comprising", will be understood to imply the inclusion of stated elements but not the exclusion of any other elements.

In addition, the terms "-er", "-or" and "module" described in the specification mean units for processing at least one function and operation and can be implemented by hardware components or software components and combinations thereof.

In this specification, a "network device" means a device which an Internet service provider installs in order to provide an Internet service to a subscriber.

Hereinafter, a transmission control method for providing an Internet service in an access network according to an exemplary embodiment of the present invention will be described in detail with reference to the drawings.

FIG. 1 is a diagram illustrating a structure of an access network according to an exemplary embodiment of the present invention. In this case, only a schematic configuration required for a description of the structure of the access network according to the exemplary embodiment of the present invention is illustrated and the structure of the access network is not limited to such a configuration.

Referring to FIG. 1, an uplink side of the network management device 20 is coupled to a server 10 via a network. A downlink side of the network management device 20 is coupled to at least one customer premise device 30 via at least one subscriber line.

The server 10 is connected to at least one service provider and the network management device 20. The server 10 performs Internet service policies and network management of the various customer premise equipment 30 installed in a home of an Internet subscriber.

According to an exemplary embodiment of the present invention, the network as a broadband network such as Fiber To The X (FTTx) including Fiber To The Home (FTTH) may include a light-line termination device such as an optical line terminal (OLT) at a terminal. Further, a cable on the downlink side of the network management device 20 may be a bundle cable that includes at least one of an unshielded twisted pair cable (UTP), a phone line, a power line, and a coaxial cable.

The network management device 20 may configure a GiGa Internet network by connecting a plurality of modems using a copper wire. The network management device 20 may be installed in a communication room or a copper terminal box of a building. The network management device 20 may be a line concentration device.

The network management device 20 according to the exemplary embodiment checks a line state of the subscriber line connected to the customer premise device 30, a traffic amount, a transmittable bandwidth, etc. Then, the network management device 20 variably sets a transmission frequency band that may service the transmission speed of the subscribed product of the customer premise device 30.

Figure 2:
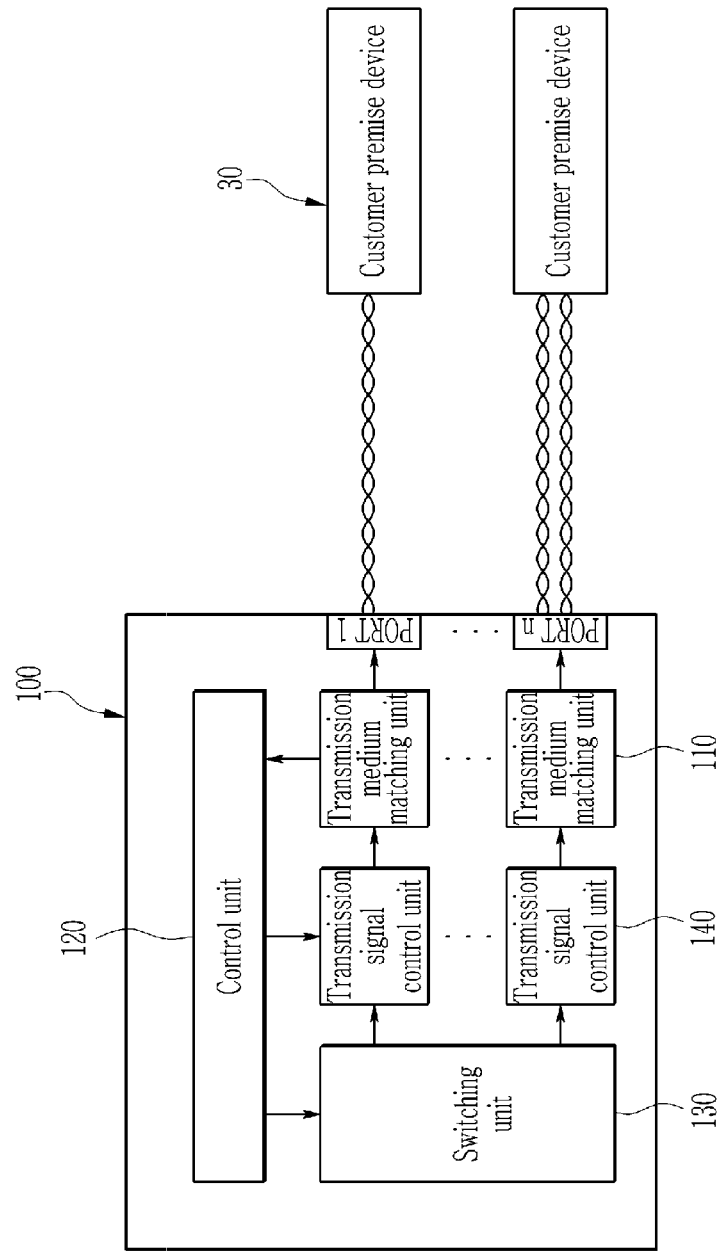
FIG. 2 is a diagram illustrating a structure of a transmission control apparatus 100 according to an exemplary embodiment of the present invention.

FIG. 2 is a diagram illustrating a structure of a transmission control apparatus 100 according to an exemplary embodiment of the present invention.

Referring to FIG. 2, the transmission control apparatus 100 may be configured to be included in the network management device 20 or may be configured to interlock with the network management device 20.

The transmission control apparatus 100 includes a transmission medium matching unit 110, a control unit 120, a data switching unit 130, and a transmission signal control unit 140. The transmission control apparatus 100 includes at least one processor and at least one memory. A processor of the transmission control apparatus 100 performs operations described in the present invention by executing instructions stored in or loaded to a memory.

The transmission medium matching unit 110 is connected to the customer premise device 30 through the subscriber line. The transmission medium matching unit 110 is basically connected to the customer premise device 30 through one pair (two strands) of transmission lines to transmit data in a single-input single-output (SISO) transmission mode. The transmission medium matching unit 110 may transmit data to the customer premise device 30 in a multi-input multiple-output (MIMO) mode through two pairs (four strands) or four pairs (eight strands) of transmission lines in order to provide a speed higher than the transmission speed at which the data may be provided through one pair.

In general, when data is transmitted through multiple pairs of transmission lines, the transmission performance is high in the multi-input multiple-output (MIMO) mode, but the transmission performance may be high in the single-input single-output (SISO) mode due to the transmission frequency band, a transmission distance, a line state such as disconnection of a line, etc., and an influence of a surrounding environment.

The control unit 120 checks the subscribed product of the customer premise device 30 for each subscriber line. In addition, the control unit 120 checks the line state of the subscriber line. In this case, the line state is determined according to a state of the line itself such as the aging of the subscriber line and the surrounding environment in which the subscriber line is installed, for example, whether the environment is humid.

The control unit 120 monitors a traffic state of the subscriber line. The control unit 120 may monitor a type of traffic, the traffic amount, an increase or decrease in traffic, etc.

The control unit 120 sets the transmission frequency band for each subscriber line. The control unit 120 may vary the transmission frequency band according to the line state of the subscriber line, the transmission speed of the subscribed product, the transmittable bandwidth, and the traffic. According to an exemplary embodiment, the control unit 120 sets a first transmission frequency band in the subscriber line. In addition, the control unit 120 reduces or expands the first transmission frequency band to a second transmission frequency band according to a triggering event. As described above, the control unit 120 allocates resources so as to use only a partial frequency band of an entire service frequency band. Therefore, crosstalk which occurs between the subscriber lines may be reduced.

The data switching unit 130 switches data to be transmitted through an external network interface and delivered to the customer premise device 30 and delivers the switched data to the transmission signal control unit 140.

The transmission signal control unit 140 controls signal transmission of the subscriber line connected to the customer premise device 30 to receive the transmission frequency band from the control unit 120 and transmit the data delivered from the data switching unit 130 in the transmission frequency band.

Figure 3:
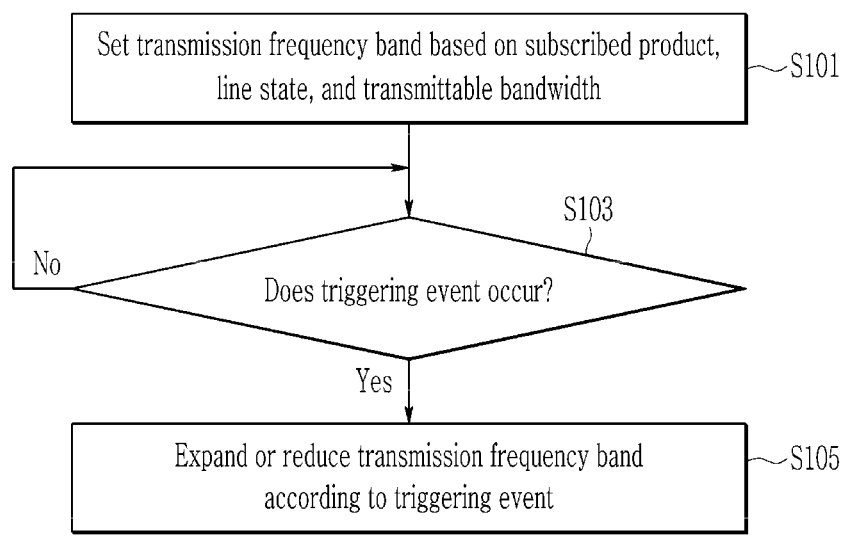
FIG. 3 is a flowchart of a method in which a transmission control apparatus performs transmission control in an access network structure according to an exemplary embodiment of the present invention.

FIG. 3 is a flowchart of a method in which a transmission control apparatus performs transmission control in an access network structure according to an exemplary embodiment of the present invention. The following flowchart is described by using the same reference numeral in conjunction with the configurations of FIGS. 1 and 2.

The control unit 120 sets the transmission frequency band based on the subscribed product, the line state, and the transmittable bandwidth for each subscriber line (S101). Here, the transmittable bandwidth is calculated according to a bit allocation amount calculated through channel estimation and signal to noise ratio (SNR) measurement.

Further, a reason for considering the line state is that since the transmission speed may be lowered up to a minimum of 10 Mbps according to the state of the line, a subscriber quality may deteriorate and a load may be generated in the line concentration device in such a case.

When the triggering event occurs (S103), the control unit 120 may change the transmission frequency band according to the triggering event, for example, reduce or expand the transmission frequency band (S105).

Here, the triggering event may include a traffic state. For example, the traffic may increase or decrease by a predefined threshold or more.

Further, the triggering event may include the presence or absence of an adjacent subscriber line or a traffic change state. For example, the adjacent subscriber line may be from an unused state to a used state or a small amount of traffic may be used and then increased to a large amount of traffic.

In this case, an operation of the control unit 120 performs the transmission control according to the exemplary embodiment of the present invention is described below as compared with the scheme in the related art.

Figure 4:
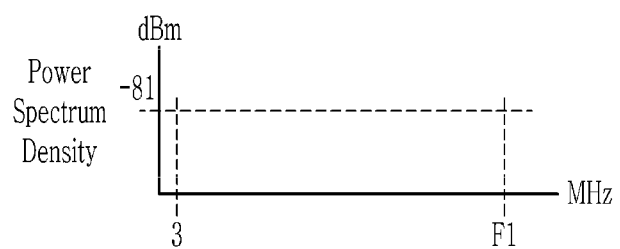
FIG. 4 illustrates a transmission frequency band in the related art.
Figure 5:
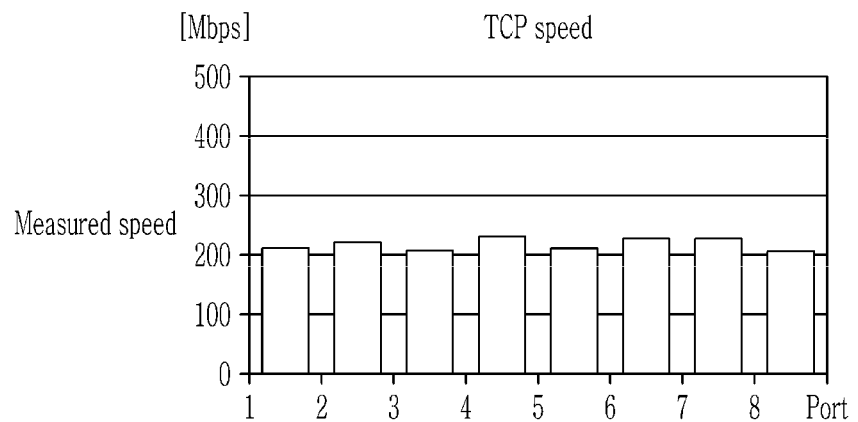
FIG. 5 illustrates a transmission speed for each subscriber line (or port) in the related art.
Figure 6:
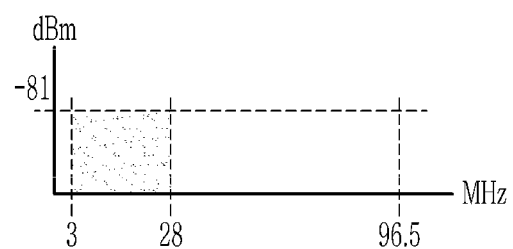
FIG. 6 illustrates a first transmission frequency band according to an exemplary embodiment of the present invention.
Figure 7:
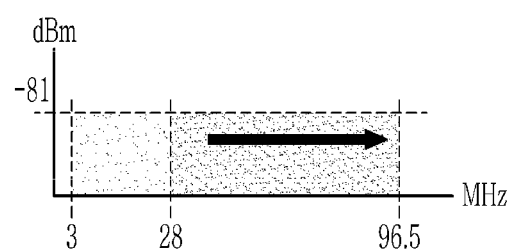
FIG. 7 illustrates a second transmission frequency band according to an exemplary embodiment of the present invention.
Figure 8:
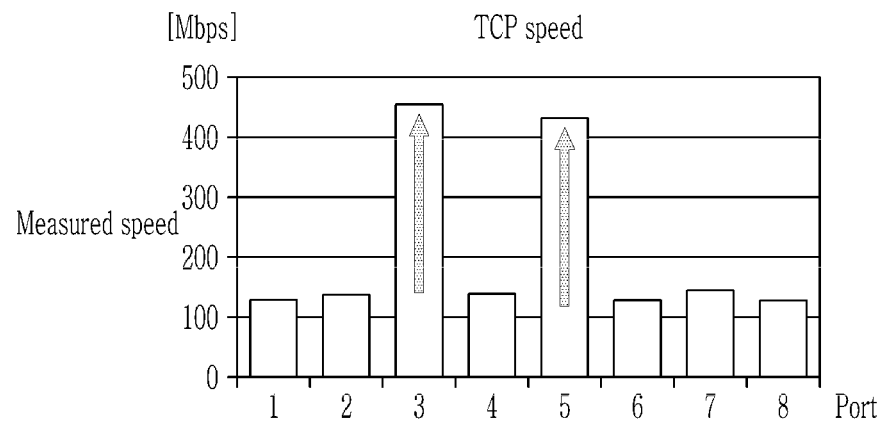
FIG. 8 illustrates a transmission speed for each subscriber line (or port) according to an exemplary embodiment of the present invention.

FIG. 4 illustrates a transmission frequency band in the related art, FIG. 5 illustrates a transmission speed for each subscriber line (or port) in the related art, FIG. 6 illustrates a first transmission frequency band according to an exemplary embodiment of the present invention, FIG. 7 illustrates a second transmission frequency band according to an exemplary embodiment of the present invention, and FIG. 8 illustrates a transmission speed for each subscriber line (or port) according to an exemplary embodiment of the present invention.

In the related art, as illustrated in FIG. 4, a maximum frequency band F1 which may be transmitted to all ports is allocated. For example, the maximum frequency band F1 may be 96.5 MHz. Of course, the frequency band is just one example and the present invention not limited thereto.

In this case, as illustrated in FIG. 5, transmission control protocol (TCP) speeds in all eight ports are measured to be approximately 200 Mbps. Therefore, the same transmission speed is provided for a customer having a high traffic usage amount and a customer having a low traffic usage amount.

In contrast, according to an exemplary embodiment of the present invention, as illustrated in FIG. 6, the control unit 120 allocates a default frequency that may provide a service basic level or speed set by an operator to all of eight ports. For example, providing approximately 100 Mbps or less is enough to use a general Internet such as web surfing, IPTV, etc. Therefore, the control unit 120 allocates a default frequency F2 that may provide 100 Mbps or less to all ports. Here, the default frequency F2 is set to a minimum frequency capable of providing 100 Mbps or less. For example, the default frequency F2 may become 28 MHz. However, this is just an example and the present invention is not limited thereto.

In this case, when the traffic increases to a reference value or more, for example, when heavy traffic occurs like speed measurement, P2P, etc., the frequency is boosted to the maximum transmittable frequency band F1 of the corresponding port. The reason for boosting the frequency is that when the traffic increases, the existing 100 Mbps is not enough.

When the port in which the traffic increases to the reference value or more is ports #3 and #5, frequency boosting is performed only in ports #3 and #5, and as a result, the transmission speeds of the ports increase to 400 Mbps and the transmission speeds of the remaining ports maintain 100 Mbps which is a lowest speed. Therefore, it can be seen that the transmission speed of the subscriber having a large traffic amount is greatly increased as compared with the transmission speed in the related art. In addition, the subscriber having a small traffic amount receives a minimum transmission speed according to the traffic amount.

The aforementioned contents are one exemplary embodiment and a transmission control method may be implemented by various exemplary embodiments.

Hereinafter, it is defined that a first frequency means a start (or lowest) frequency forming the transmission frequency band and a second frequency means a termination (or a maximum) frequency forming the transmission frequency band.

First Exemplary Embodiment

Figure 9:
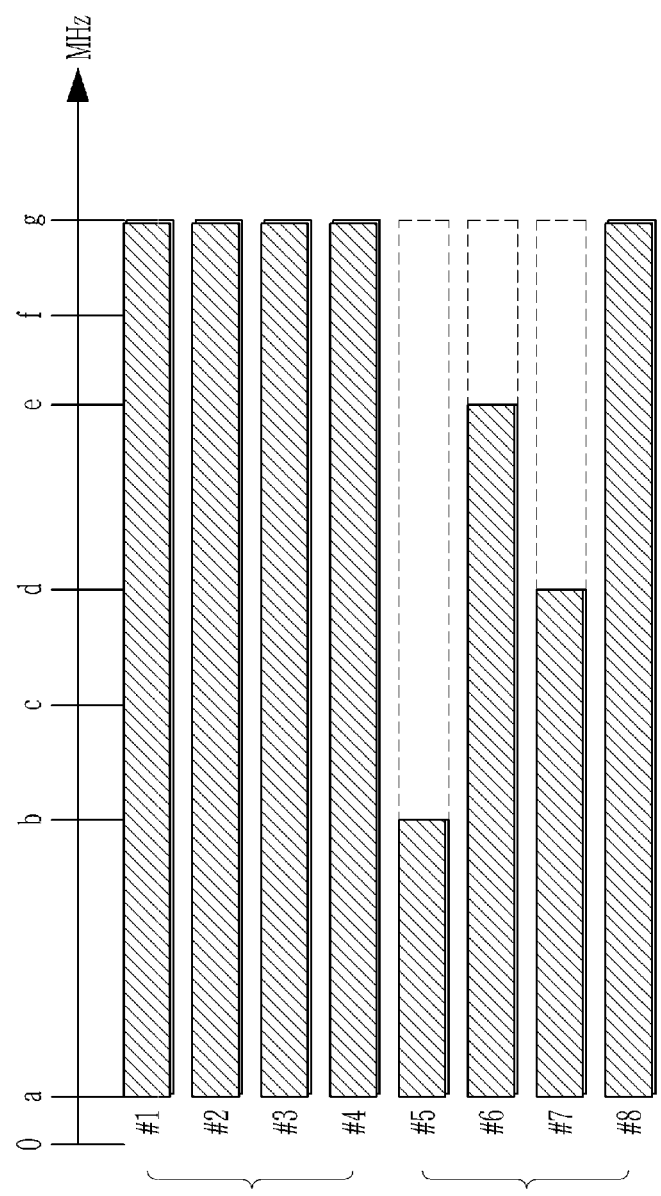
FIG. 9 is an exemplary diagram of transmission frequency band allocation setting according to an exemplary embodiment of the present invention.

FIG. 9 is an exemplary diagram of transmission frequency band allocation setting according to an exemplary embodiment of the present invention.

Referring to FIG. 9, the transmission control scheme in the related art is applied to first subscriber line #1, second subscriber line #2, third subscriber line #3, and fourth subscriber line #4 and all subscriber lines #1 to #4 are set to the same transmission frequency band. For example, a frequency band between a first frequency (=a) and a second frequency (=g) is set to a transmission frequency band in which a signal is transmitted.

In this case, all of subscriber lines #1 to #4 have the same first and second frequencies, which are fixed. Therefore, mutual crosstalk occurs because all of subscriber lines #1 to #4 use the same transmission frequency band.

In contrast, the transmission control scheme according to the exemplary embodiment of the present invention is applied to fifth subscriber line #5, sixth subscriber line #6, seventh subscriber line #7, and eighth subscriber line #8 and in respective subscriber lines #5 to #8, different first and second frequencies are set.

Of course, in the drawing, the first frequency is set equally to "a", which is basically because a low frequency produces less crosstalk problems. However, this is not particularly the case and a subscriber line in which the first frequency is set differently according to a policy of the operator is also possible.

Further, although the second frequency is set to "g" in the drawing, the second frequency is not limited thereto, and is only an example of a frequency set to correspond to the frequency band in the related art in order to describe a non-crosstalk interval. The second frequency may be set to any frequency included in the service frequency band of a service provider.

According to the exemplary embodiment of the present invention, in fifth subscriber line #5, a frequency band between the first frequency (=a) and the second frequency (=b) is set to the transmission frequency band in which the signal is transmitted. In sixth subscriber line #6, a frequency band between the first frequency (=a) and a second frequency (=e) is set to the transmission frequency band in which the signal is transmitted. In seventh subscriber line #7, a frequency band between the first frequency (=a) and a second frequency (=d) is set to the transmission frequency band in which the signal is transmitted. In eighth subscriber line #8, a frequency band between the first frequency (=a) and a second frequency (=g) is set to the transmission frequency band in which the signal is transmitted.

In this case, the signal is transmitted only in the transmission frequency band among all service frequency bands and no signal is transmitted in the remaining frequency bands. Therefore, the remaining frequency bands in which no signal is transmitted may be used alone without crosstalk when used in another subscriber line.

For example, in the case of the frequency band "d-g" of the transmission frequency band "a-g" of the eighth subscriber line #8, since no signal is transmitted in seventh subscriber line #7, the frequency band "d-g" is the non-crosstalk interval in which the crosstalk does not occur. Therefore, the non-crosstalk interval may be used alone on eighth subscriber line #8 without the crosstalk.

The above-described transmission frequency band is variably set according to various conditions for each subscriber line. That is, the first frequency and the second frequency are set differently for each subscriber line, and a range (or size) of the transmission frequency band formed by the first frequency and the second frequency may also be set differently for each subscriber line.

Here, various conditions on which the setting is based may include at least one of a transmission speed (or a transmission rate) depending on a service level or a service quality of the subscribed product, a transmittable bandwidth of the subscriber line, a line state, and a traffic state and in addition to the various conditions, various conditions may be added.

The transmission speed depends on the subscribed product, for example, when the subscribed product is 100 M product, the transmission speed becomes 100 Mbps and when the subscribed product is 500 M product, the transmission speed becomes 500 Mbps. In this case, a lowest transmission speed (or a default transmission rate) may be set regardless of the subscribed product according to the policy of the operator. That is, the subscribed product is 500 Mbps, but when the subscriber uses a general Internet such as a basic Internet, for example, web surfing, IPTV, etc., a transmission speed of 100 Mbps is sufficient. Therefore, the default transmission speed is 100 Mbps. As another example, the operator may set the transmission speed to service the default transmission speed to be minimally provided to subscribers in order to assure a uniform Internet quality.

Of course, when the traffic of the subscriber line increases while the subscriber uses the Internet at the default transmission speed, that is, when the subscriber uses a moving image service, etc., 500 Mbps which is the transmission speed of the subscribed product needs to be assumed as the transmission speed.

The transmittable bandwidth is calculated according to a bit allocation amount calculated through channel estimation and signal to noise ratio (SNR) measurement.

Then, various exemplary embodiments of variably setting the transmission frequency band according to various conditions will be described. In this case, the exemplary embodiment in which the first frequency is fixed to a is described. In addition, the exemplary embodiments are described based on an arbitrary subscriber line.

Second Exemplary Embodiment

Figure 10:
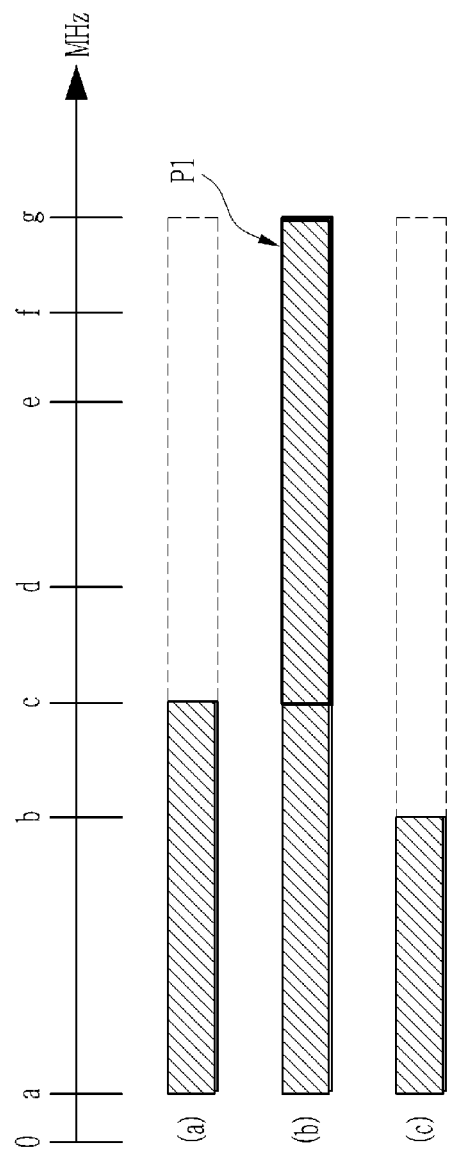
FIG. 10 is an exemplary diagram of transmission frequency band allocation setting according to another exemplary embodiment of the present invention.

FIG. 10 is an exemplary diagram of transmission frequency band allocation setting according to another exemplary embodiment of the present invention.

According to the exemplary embodiment of the present invention, as illustrated in FIG. 10A, a frequency band including the first frequency (=a) and the second frequency (=c) is set as the transmission frequency band in an arbitrary subscriber line (hereinafter, collectively referred to as subscriber line #1).

Here, the transmission frequency band is set based on the line state of subscriber line 1, the subscribed product, and the transmittable bandwidth.

this case, when the triggering event such as the increase in traffic of subscriber line 1, etc., occurs, the second frequency is changed to "g" to expand the frequency bandwidth as illustrated in FIG. 10B. That is, since the transmission frequency band is a frequency band including the first frequency (=a) and the second frequency (=g), the transmission frequency band has a larger bandwidth than the previous frequency band including the first frequency (=a) and the second frequency (=c) by "c-g (P1)".

Meanwhile, when the triggering event such as the decrease in traffic of subscriber line 1, etc., occurs, the second frequency is changed and the second frequency is changed to "b" to reduce the frequency bandwidth as illustrated in FIG. 100. In this case, when the transmittable bandwidth of subscriber line 1 is improved as compared with FIG. 10A, the second frequency may be set to "b" instead of "c".

The second frequency may be variably set within a maximum frequency range that may assure the transmission speed according to the service level of the subscribed product of the subscription line 1. For example, in case of the 500 M product of subscriber line 1, the second frequency may be set differently according to the line state and the transmittable bandwidth so that the second frequency is a frequency band capable of providing a speed of 500 Mbps within the entire service frequency band of the service provider.

According to an exemplary embodiment, in FIGS. 10A, 10B, and 100, the second frequency may be a value calculated according to the line state, the subscribed product, and the transmittable bandwidth of subscriber line 1.

According to another exemplary embodiment, in FIGS. 10A, 10B, and 100, the second frequency may be selected according to the line state, the subscribed product, and the transmittable bandwidth of subscriber line 1 among frequencies set by the operator according to the policy.

Figure 11:
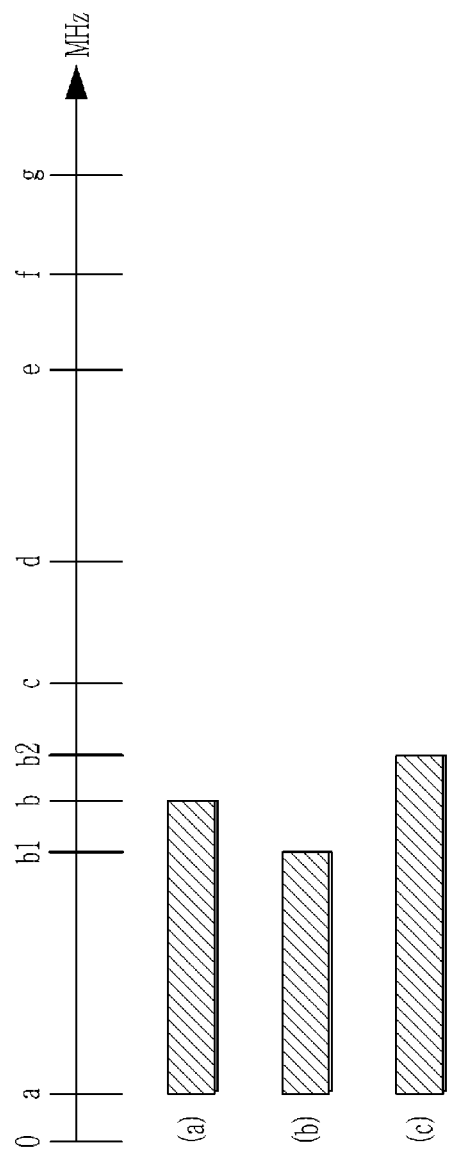
FIG. 11 is an exemplary diagram of transmission frequency band allocation setting according to yet another exemplary embodiment of the present invention.

FIG. 11 is an exemplary diagram of transmission frequency band allocation setting according to still yet another exemplary embodiment of the present invention.

Referring to FIG. 11, the first frequency is fixed to "a" and the second frequency is preset to "b", "c", "d", "e", "f", and "g". Here, "g" is assumed as a frequency that may be maximally provided among subscribed products provided by the service provider.

For example, when the line state of subscriber line 1 is "good" and the subscribed product is "500M", the second frequency may be set to "b" as illustrated in FIG. 11A.

In this case, when the transmittable bandwidth of subscriber line 1 is higher than a reference value or better than a reference quality, the second frequency of subscriber line 1 may be set to "b1" which is lower than the default frequency "b", as illustrated in FIG. 11B. In addition, when the transmittable bandwidth of subscriber line 1 is lower than the reference value or worse than the reference quality, the second frequency of subscriber line 1 may be set to "b2" which is higher than the default frequency "b", as illustrated in FIG. 11C.

When the triggering event such as the traffic increases occurs in this state, the second frequency is changed to a frequency for servicing the transmission speed of the subscribed product.

Third Exemplary Embodiment

Figure 12:
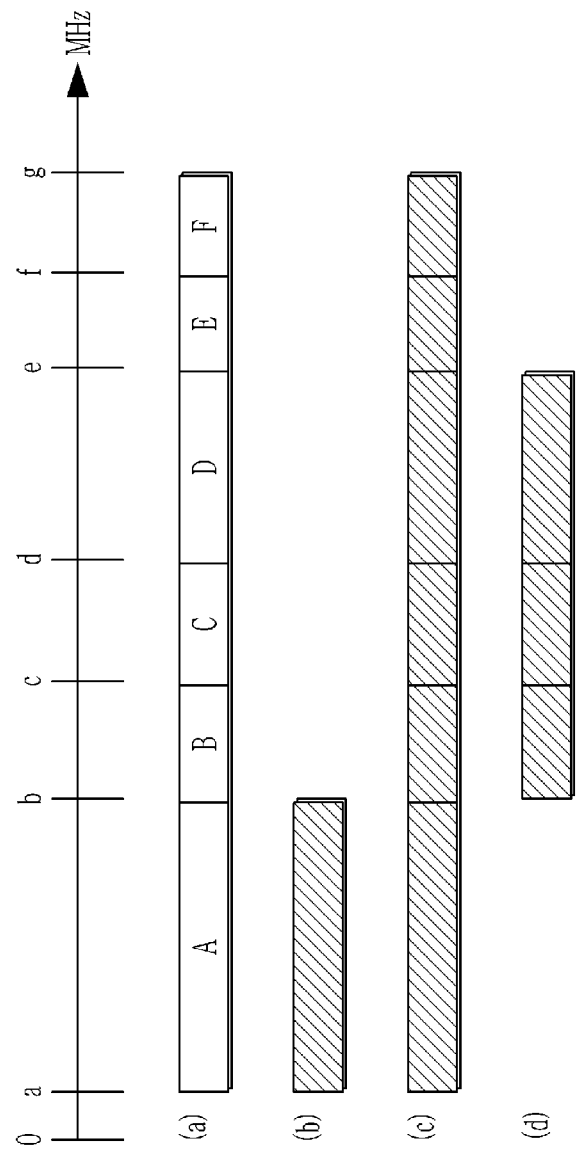
FIG. 12 is an exemplary diagram of transmission frequency band allocation setting according to still another exemplary embodiment of the present invention.

FIG. 12 is an exemplary diagram of transmission frequency band allocation setting according to still yet another exemplary embodiment of the present invention.

Referring to FIG. 12, the service frequency band may be divided into a plurality of frequency intervals.

Referring to FIG. 12A, the service frequency band is constituted by frequency interval A, frequency interval B, frequency interval C, frequency interval D, frequency interval E, and frequency interval F.

Here, the frequency interval A includes a frequency band between the frequencies "a" and "b". The frequency interval B includes a frequency band between the frequencies "b" and "c". The frequency interval C includes a frequency band between the frequencies "c" and "d". The frequency interval D includes a frequency band between the frequencies "d" and "e". The frequency interval E includes a frequency band between the frequencies "e" and "f". The frequency interval F includes a frequency band between the frequencies "f" and "g".

At least one consecutive frequency interval may be selected as a transmission frequency band or may be turned frequency-on/off in consideration of the line state, the subscribed product, and the transmittable bandwidth of subscriber line 1 among the plurality of frequency intervals. That is, the frequency band may be operated in such a scheme that only the selected frequency interval is turned on for subscriber line 1 in the plurality of frequency intervals and the unselected frequency interval is turned off.

Referring to FIG. 12B, the frequency interval A may be selected as the transmission frequency band for subscriber line 1.

Referring to FIG. 12C, the frequency interval A, the frequency interval B, the frequency interval C, the frequency interval D, the frequency interval E, and the frequency interval F may be selected as the transmission frequency band for subscriber line 1.

Referring to FIG. 12D, the frequency interval B, the frequency interval C, and the frequency interval D may be selected as the transmission frequency band for subscriber line 1 (#11).

Here, FIG. 12B is set to the initial transmission frequency band, and when the triggering event occurs, the transmission frequency band may be changed to FIG. 12C or 12D.

Fourth Exemplary Embodiment

Figure 13:
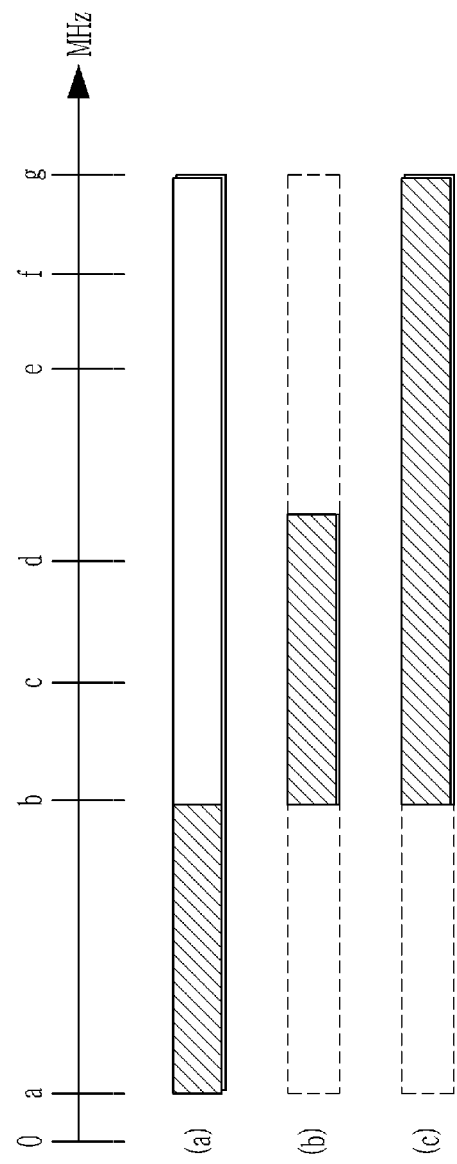
FIG. 13 is an exemplary diagram of transmission frequency band allocation setting according to still yet another exemplary embodiment of the present invention.

FIG. 13 is an exemplary diagram of transmission frequency band allocation setting according to still yet another exemplary embodiment of the present invention.

Referring to FIG. 13, it is assumed that only subscriber line 1 is usable. In this case, subscriber line 1 may be implemented with one bundle cable together with a plurality of subscriber lines.

Referring to FIG. 13A, the transmission frequency band including the first frequency (=a) and the second frequency (=b) or the interval A described in FIG. 12 is set as the transmission frequency band for subscriber line 1. In this case, when subscriber line 2 becomes usable, the transmission frequency band may be set for subscriber line 2 as illustrated in FIGS. 13B and 13C. That is, the transmission frequency band of subscriber line 2 may be set in a non-transmission interval (b-g) of subscriber line 1.

That is, the non-crosstalk interval which is a frequency interval in which the mutual crosstalk between the subscriber lines 1 and 2 may be minimized, may be set as the transmission frequency band of subscriber line 2.

Fifth Exemplary Embodiment

Figure 14:
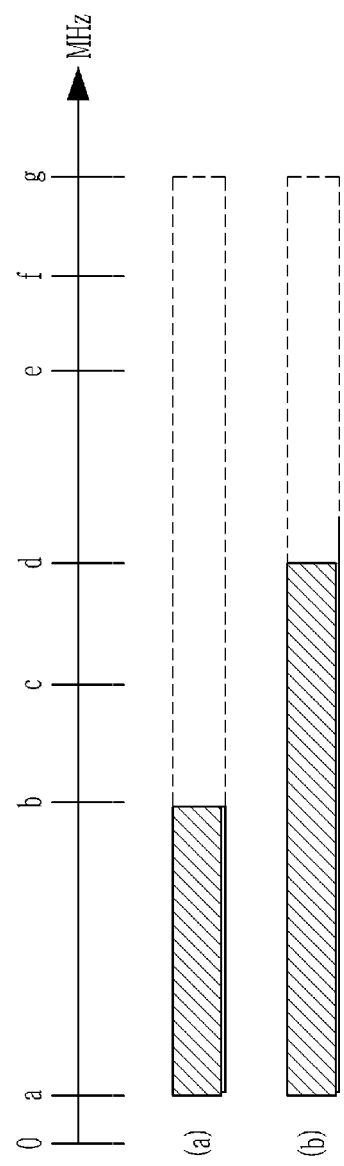
FIG. 14 is an exemplary diagram of transmission frequency band allocation setting according to still yet another exemplary embodiment of the present invention.

FIG. 14 is an exemplary diagram of transmission frequency band allocation setting according to still yet another exemplary embodiment of the present invention.

In this case, the operator may operate a frequency transmission control table as shown in Table 1 below.

TABLE 1

| Line state | Subscribed product | First frequency (MHz) | Second frequency$_1$ (MHz) | Default transmission speed (Mbps) | Second frequency$_2$ (MHz) | Transmission speed (Mbps) | Non-crosstalk interval |
|---|---|---|---|---|---|---|---|
| Good | 100 M Internet | a | b | 100 | b | 100 | b-g interval |
|  | 500 M Internet |  |  |  | d | 500 | d-g interval |
|  | 5 G Internet |  |  |  | e | 5 G | e-g interval |

TABLE 1-continued

| Line state | Subscribed product | First frequency (MHz) | Second frequency$_1$ (MHz) | Default transmission speed (Mbps) | Second frequency$_2$ (MHz) | Transmission speed (Mbps) | Non-crosstalk interval |
|---|---|---|---|---|---|---|---|
| Bad | 100 M Internet | | c | | c | 100 | c-g interval |
| | 500 M Internet | | | | f | 500 | f-g interval |
| | 5 G Internet | | | | g | 5 G | — |

According to Table 1, the first frequency is the same as "a" MHz. In addition, the second frequency$_1$ and the second frequency$_2$ are set differently depending on the line state and the subscribed product.

According to an exemplary embodiment, when the line state of subscriber line 1 is measured and corresponds to "good", and in the case where the subscribed product is the 500 M product, according to Table 1, since the first frequency is a and the second frequency$_1$ (MHz) is "b", the frequency is set as illustrated in FIG. 14A. In this case, when the triggering event occurs such as the increase in traffic of the subscriber line 1 or significant improvement of a surrounding traffic state of subscriber line 1 occurs, the frequency is changed to the second frequency$_2$. That is, according to Table 1, the second frequency$_2$ is changed to "d". Therefore, as illustrated in FIG. 14B, the frequency bandwidth of subscriber line 1 is expanded from "a-b" to "a-d". In this case, the non-crosstalk interval is the "d-g" interval.

Sixth Exemplary Embodiment

Figure 15:
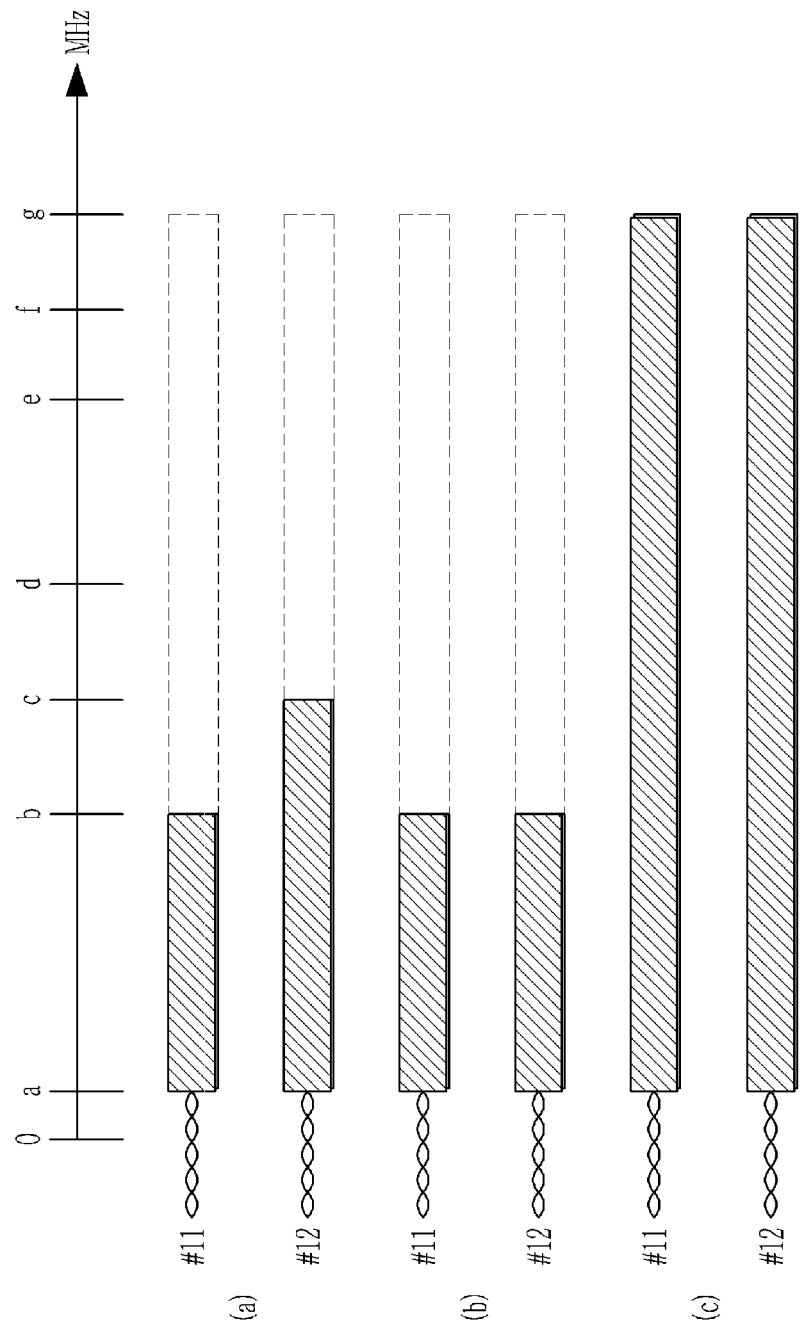
FIG. 15 is an exemplary diagram of transmission frequency band allocation setting according to still yet another exemplary embodiment of the present invention.

FIG. 15 is an exemplary diagram of transmission frequency band allocation setting according to still yet another exemplary embodiment of the present invention.

In this case, it is assumed that the subscribed products of the subscriber lines are the same as each other and the subscribe line is 1 pair.

Referring to FIG. 15A, the transmission frequency band of subscriber line 1 (#11) includes the first frequency (=a) and the second frequency (=b) and the transmission frequency band of subscriber line 2 (#12) includes the first frequency (=a) and the second frequency (=c). The transmission frequency bands of subscriber line 1 (#11) and subscriber line 2 (#12) may be different depending on the line state, the transmittable bandwidth, etc.

Referring to FIG. 15B, the transmission frequency bands of subscriber line 1 (#11) and subscriber line 2 (#12) include the first frequency (=a) and the second frequency (=b). That is, the transmission frequency bands of subscriber line 1 (#11) and subscriber line 2 (#12) may be set to be the same as each other. In this case, the transmission frequency band may be set to service the lowest transmission speed set by the operator.

When the triggering event occurs, subscriber line 1 (#11) and subscriber line 2 (#12) may be expanded to the same transmission frequency band as illustrated in FIG. 15C. In this case, the second frequency may be limited to service the transmission speed provided by the subscribed product. In addition, subscriber line 1 (#11) and subscriber line 2 (#12) may be expanded to be different from each other with a limited frequency range. The reason is that the subscribed products of subscriber line 1 (#11) and subscriber line 2 (#12) are the same as each other, but subscriber line 1 (#11) and subscriber line 2 (#12) may be different in terms of the line state, the transmittable bandwidth, the traffic amount, etc.

Seventh Exemplary Embodiment

Figure 16:
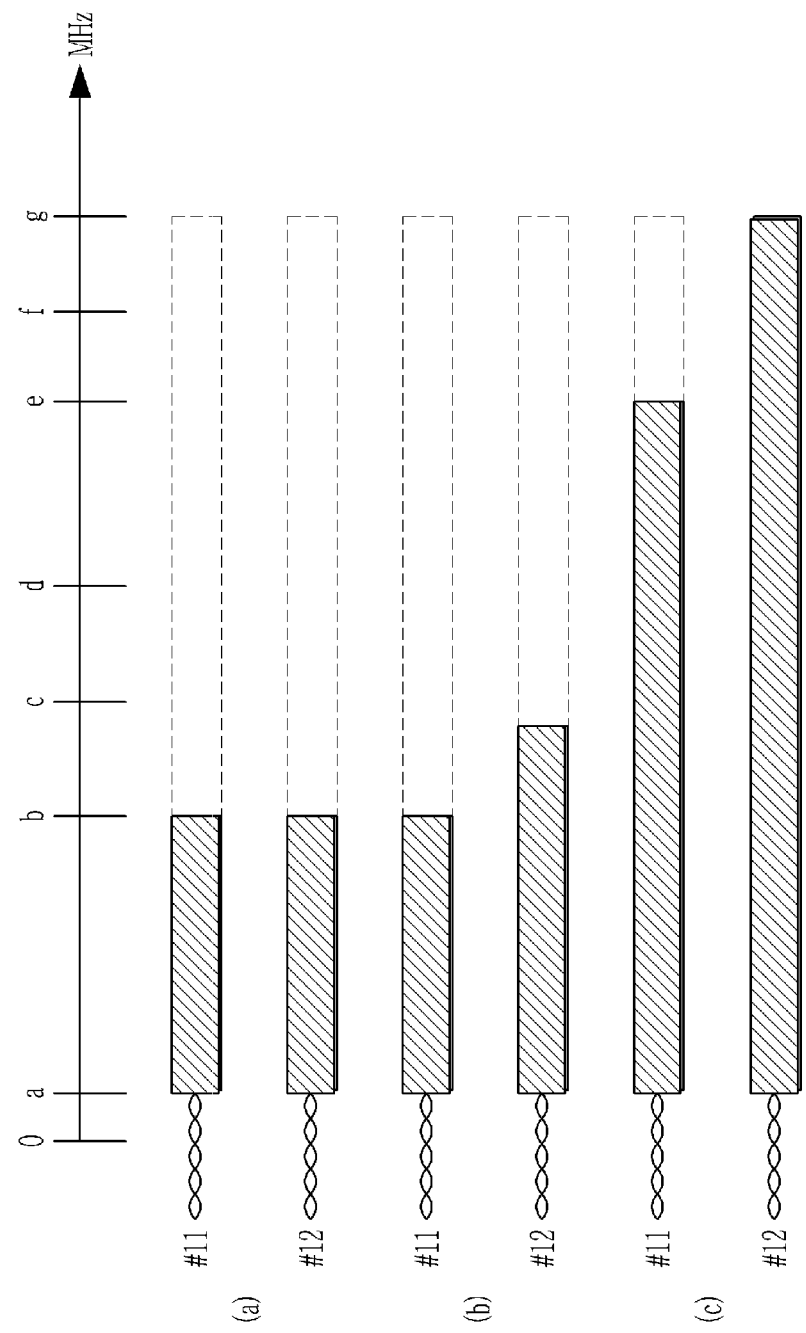
FIG. 16 is an exemplary diagram of transmission frequency band allocation setting according to still yet another exemplary embodiment of the present invention.

FIG. 16 is an exemplary diagram of transmission frequency band allocation setting according to still yet another exemplary embodiment of the present invention.

In this case, it is assumed that the subscribed products of the subscriber lines are different from each other and the subscribe line is 1 pair.

Referring to FIG. 16A, the transmission frequency bands of subscriber line 1 (#11) and subscriber line 2 (#12) include the first frequency (=a) and the second frequency (=b). That is, the transmission frequency bands of subscriber line 1 (#11) and subscriber line 2 (#12) may be set to be the same as each other. In this case, the transmission frequency band may be set to service the lowest transmission speed set by the operator.

Referring to FIG. 16B, the transmission frequency band of the subscriber line 1 (#11) includes the first frequency (=a) and the second frequency (=b) and the transmission frequency band of the subscriber line 2 (#12) includes the first frequency (=a) and the second frequency (=c). Since the subscribed products of subscriber line 1 (#11) and subscriber line 2 (#12) are different from each other, the transmission frequency bands may be set to be different so as to service different transmission speeds.

When the triggering event occurs, subscriber line 1 (#11) and subscriber line 2 (#12) are expanded to different transmission frequency bands as illustrated in of FIG. 16C. That is, in subscriber line (#11), the transmission frequency band including the first frequency (=a) and the second frequency (=e) is set so as to service the transmission speed provided by the subscribed product. In addition, in subscriber line 2 (#12), the transmission frequency band including the first frequency (=a) and the second frequency (=g) is set so as to service the transmission speed provided by the subscribed product.

Eighth Exemplary Embodiment

Figure 17:
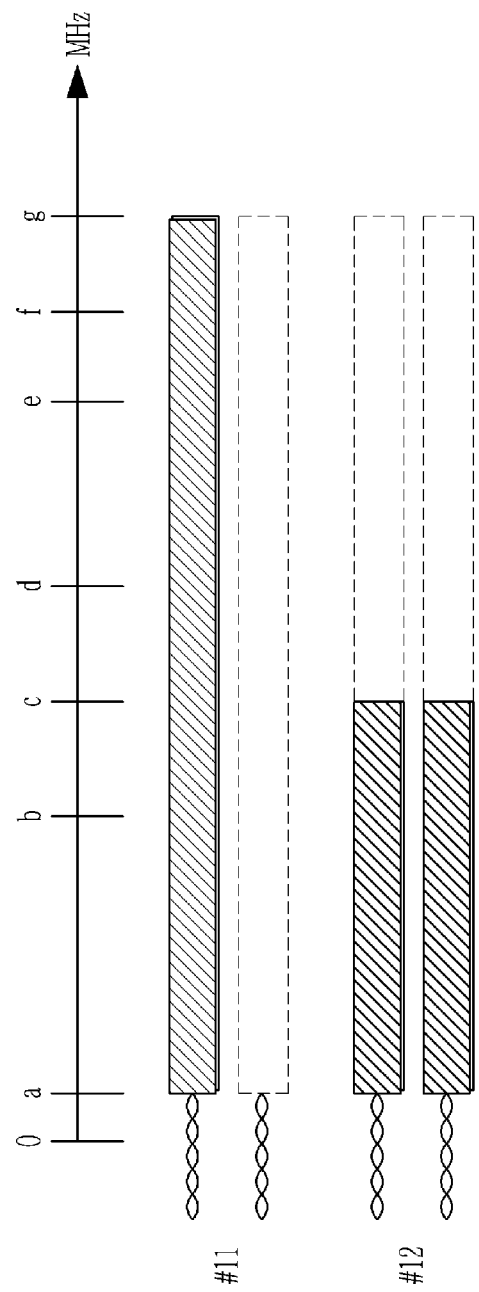
FIG. 17 is an exemplary diagram of transmission frequency band allocation setting according to still yet another exemplary embodiment of the present invention.
Figure 18:
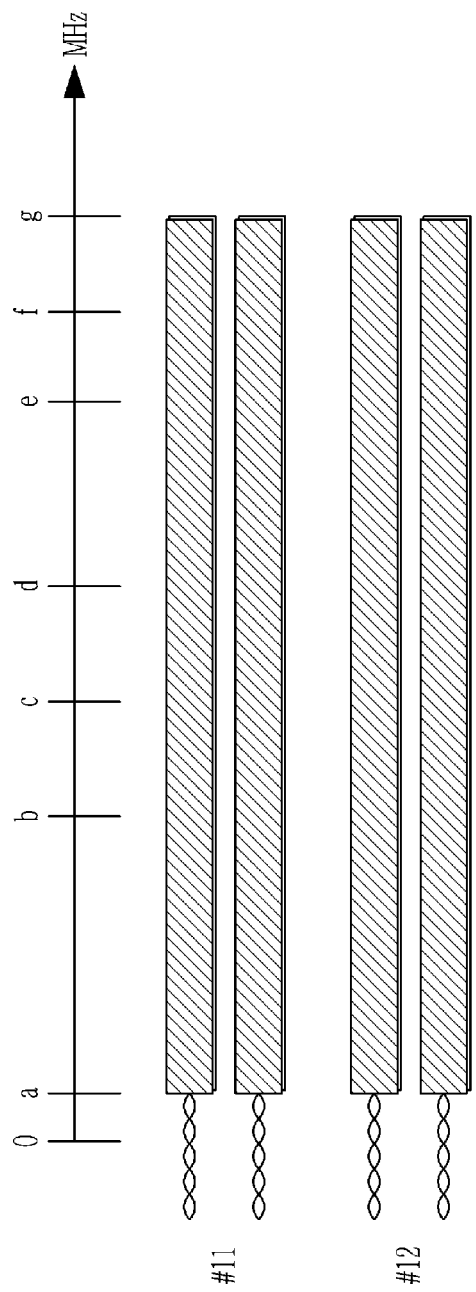
FIG. 18 is an exemplary diagram of transmission frequency band allocation setting according to still yet another exemplary embodiment of the present invention.

FIG. 17 is an exemplary diagram of transmission frequency band allocation setting according to still yet another exemplary embodiment of the present invention and FIG. 18 is an exemplary diagram of transmission frequency band allocation setting according to still yet another exemplary embodiment of the present invention.

In this case, it is assumed that the subscribed products of the subscriber lines are the same as each other and the subscribe line is 2 pairs. That is, one subscriber line includes a first transmission line (1 pair) and a second transmission line (1 pair)

Referring to FIG. 17, in the first transmission line of subscriber line 1 (#11), the transmission frequency band including the first frequency (=a) and the second frequency (=g) is set so as to service the transmission speed provided by the subscribed product. In addition, the transmission frequency band of the second transmission line is not set. That is, the signal is transmitted only through the first transmission line and the signal is not transmitted in the second transmission line.

In each of the first transmission line and the second transmission line of subscriber line 2 (#12), the transmission frequency band including the first frequency (=a) and the second frequency (=c) is set so as to service the transmission speed provided by the subscribed product. In this case, when the transmission frequency band of the first transmission line and the transmission frequency band of the second transmission line are added together, the added transmission frequency band becomes the entire transmission frequency band, that is, the transmission frequency band including the first frequency (=a) and the second frequency (=g).

In this way, there is an effect that the crosstalk does not occur in the non-transmission interval in the first transmission line and the second transmission line.

In this case, when the triggering event occurs, as illustrated in FIG. 18, the transmission frequency bands of all transmission lines of subscriber line 1 (#11) and subscriber line 2 (#12) are expanded to the transmission frequency band including the first frequency (=a) and the second frequency (=g) so as to service the transmission speed provided by the subscribed product.

Ninth Exemplary Embodiment

Figure 19:
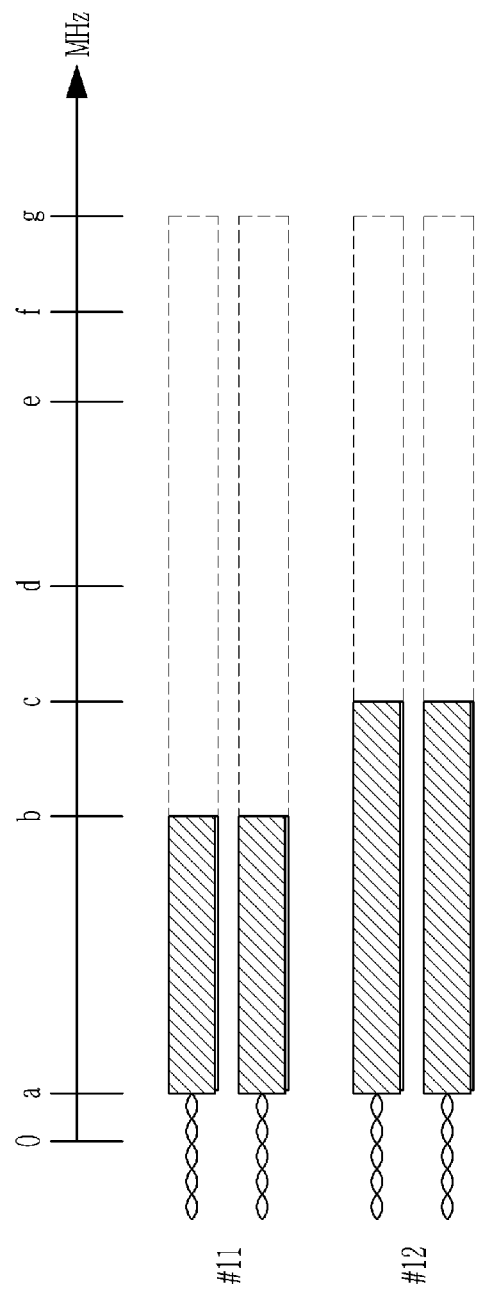
FIG. 19 is an exemplary diagram of transmission frequency band allocation setting according to still yet another exemplary embodiment of the present invention.
Figure 20:
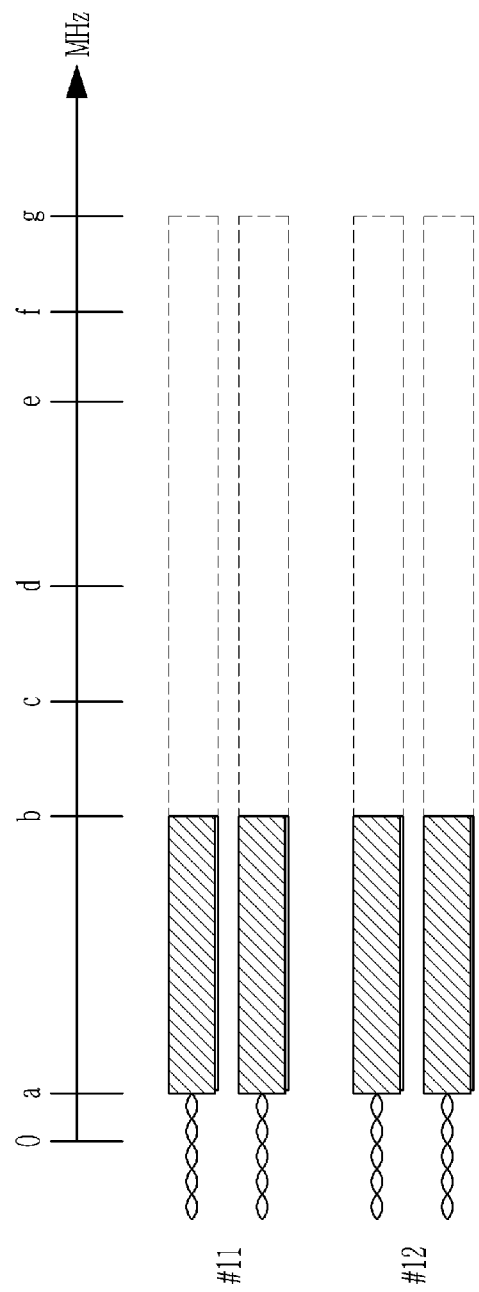
FIG. 20 is an exemplary diagram of transmission frequency band allocation setting according to still yet another exemplary embodiment of the present invention.
Figure 21:
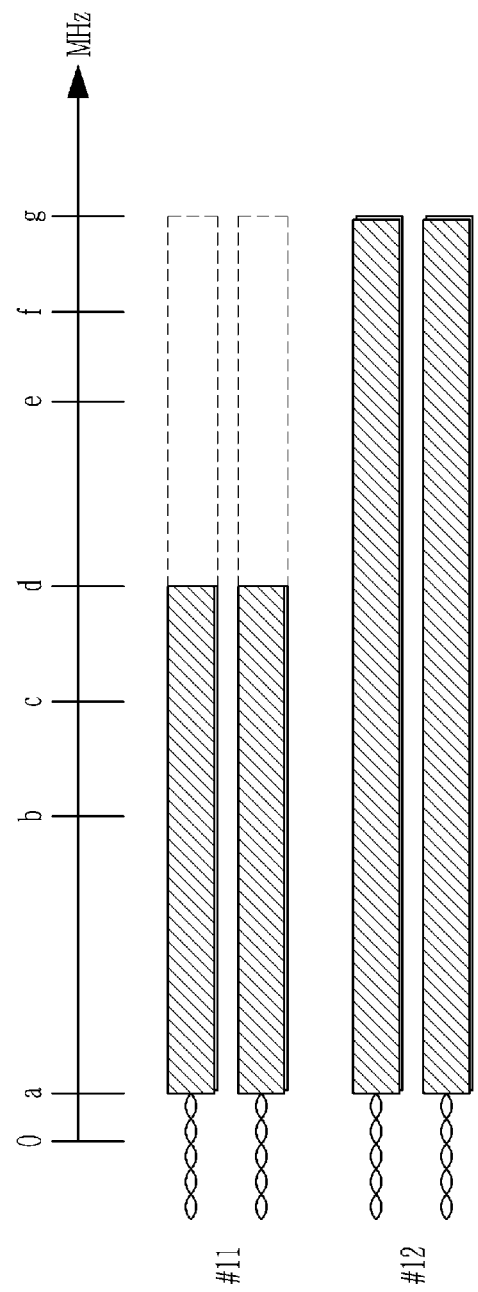
FIG. 21 is an exemplary diagram of transmission frequency band allocation setting according to still yet another exemplary embodiment of the present invention.

FIG. 19 is an exemplary diagram of transmission frequency band allocation setting according to still yet another exemplary embodiment of the present invention, FIG. 20 is an exemplary diagram of transmission frequency band allocation setting according to still yet another exemplary embodiment of the present invention, and FIG. 21 is an exemplary diagram of transmission frequency band allocation setting according to still yet another exemplary embodiment of the present invention.

In this case, it is assumed that the subscribed products of the subscriber lines are different from each other and the subscribe line is 2 pairs. That is, one subscriber line includes the first transmission line (1 pair) and the second transmission line (1 pair).

Referring to FIG. 19, in the first transmission line and the second transmission line of subscriber line 1 (#11), the transmission frequency band including the first frequency (=a) and the second frequency (=b) is set so as to service the transmission speed provided by the subscribed product. In addition, in each of the first transmission line and the second transmission line of subscriber line 2 (#12), the transmission frequency band including the first frequency (=a) and the second frequency (=c) is set so as to service the transmission speed provided by the subscribed product. In this way, each of subscriber line 1 (#11) and subscriber line 2 (#12) is set to the transmission frequency band for servicing the transmission speed of the subscribed product.

Referring to FIG. 20, in the first transmission line and the second transmission line of subscriber line 1 (#11) and subscriber line 2 (#12), the transmission frequency band including the first frequency (=a) and the second frequency (=b) is set. In this way, the transmission frequency bands of subscriber line 1 (#11) and subscriber line 2 (#12) are set to be the same as each other regardless of the subscribed product. In this case, the transmission frequency bands may be similarly set to the transmission frequency band for servicing the lowest transmission speed set by the operator.

In this case, when the triggering event occurs, subscriber line 1 (#11) and subscriber line 2 (#12) are expanded to different transmission frequency bands as illustrated in FIG. 21. That is, in subscriber line #11, the transmission frequency band including the first frequency (=a) and the second frequency (=d) is set so as to service the transmission speed provided by the subscribed product. In addition, in subscriber line 2 (#12), the transmission frequency band including the first frequency (=a) and the second frequency (=g) is set so as to service the transmission speed provided by the subscribed product.

Meanwhile, up to now, in the exemplary embodiment, contents regarding adjustment of the transmission frequency range or the transmission frequency band of the subscriber line are described and a next exemplary embodiment relates to contents regarding adjustment of a transmission strength.

Tenth Exemplary Embodiment

When there is no traffic generated by the subscriber, only a small quantity of signals for maintaining a link between the network management device 20 and a customer premise device 300 exist in the subscriber line.

In this case, when the default frequency band is set in the subscriber line, the transmission strength may be reduced. Reducing the transmission strength may reduce a signal that affects other lines, that is, a crosstalk signal.

Figure 22:
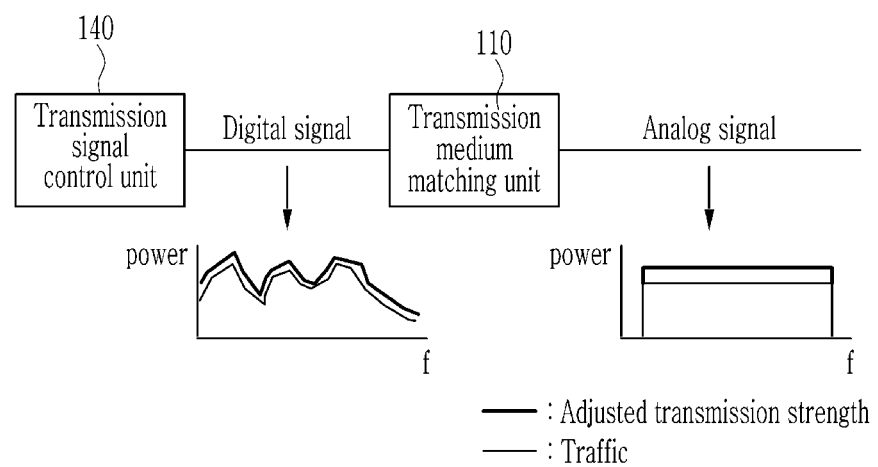
FIG. 22 is an exemplary diagram of adjusting a transmission strength according to still yet another exemplary embodiment of the present invention.

FIG. 22 is an exemplary diagram of adjusting a transmission strength according to still yet another exemplary embodiment of the present invention.

Referring to FIG. 22, the transmission signal control unit 140 transmits a digital signal to the transmission medium matching unit 110. The transmission medium matching unit 110 converts the digital signal into an analog signal and transmits the analog signal to the customer premise device 300.

In this case, a transmission strength in a time domain for the digital signal output by the transmission signal control unit 140 may be adjusted according to a traffic amount of the subscriber.

Further, a transmission strength in a frequency domain for the analog signal output by the transmission medium matching unit 110 may be adjusted according to the traffic amount of the subscriber.

In this case, the transmission strength may be adjusted in any one of the digital signal and the analog signal.

For example, when the traffic amount of the subscriber is determined to be equal to or more than a predetermined threshold value, transmission signal strengths of both the digital signal and the analog signal may be increased.

The control unit 120 of FIG. 2 may perform each of adjustment of the frequency band and adjustment of the transmission strength according to the monitored traffic amount. Alternatively, the adjustment of the frequency band and the adjustment of the transmission strength may be simultaneously performed according to the monitored traffic amount. A signal not required for transmission is minimized through such an operation to optimize transmission performance by minimizing a signal which interferes with other lines.

According to an exemplary embodiment, the control unit 120 may expand the transmission frequency band and reduce the transmission strength according to the monitored traffic amount. Alternatively, the transmission frequency band may be reduced and the transmission strength may be increased. Here, the transmission frequency band and the transmission strength are adjusted to accommodate the traffic amount of the subscriber. In this case, detailed adjustment values may be set to various exemplary embodiments by the operator.

In this way, when the transmission frequency band is expanded, the crosstalk signal is delivered to a wider transmission frequency band, but the transmission strength is reduced, thereby reducing an crosstalk signal strength.

Further, when the transmission strength is increased, the crosstalk signal strength increases, but the transmission frequency band is reduced, thereby reducing a frequency band influenced by the crosstalk signal.

Therefore, the control unit 120 may optimize the entire subscriber line by adjusting the transmission frequency band and the transmission frequency strength in consideration of the traffic amount of the subscriber and usage state of other lines.

The exemplary embodiments of the present invention described above are not implemented only through the apparatus and the method and can be implemented through a program which realizes a function corresponding to a configuration of the exemplary embodiments of the present invention or a recording medium having the program recorded therein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for controlling transmission frequency for a subscriber line of a customer premise device by a transmission control apparatus in an access network structure in which at least one network management device and a plurality of customer premise devices are connected through a bundle cable including a plurality of subscriber lines, the method comprising:
    setting a partial frequency band in an entire service frequency band provided by the subscriber line as a transmission frequency band of the customer premise device; and
    varying the transmission frequency band in the entire service frequency band when a triggering event occurs,
    wherein traffic of the customer premise device is transmitted and received in the transmission frequency band, and
    wherein the varying the transmission frequency band includes:
        varying a size of the transmission frequency band within the entire service frequency band upon the occurrence of the triggering event including changes in usage states of an adjacent subscriber line.

2. The method of claim 1, wherein the setting a partial frequency band includes setting the transmission frequency band based on at least one of a contract transmission speed, a subscriber line state, and a traffic amount of the customer premise device.

3. The method of claim 1, wherein when the traffic amount of the customer premise device satisfies the triggering event, the varying the transmission frequency band includes changing a size of the transmission frequency band.

4. The method of claim 1, further comprising:
    setting a default transmission frequency band for each contract transmission speed,
    wherein the setting a default transmission frequency band includes obtaining a default frequency band of the customer premise device based on a subscribed product of the customer premise device and setting the obtained default frequency band in the customer premise device.

5. The method of claim 4, wherein when the triggering event in which an adjacent subscriber line is changed from an unused state to a used state occurs, the varying the transmission frequency band includes changing a size of the default frequency band according to a transmission frequency band set in the adjacent subscriber line.

6. The method of claim 1, further comprising:
    dividing the entire service frequency band into a plurality of intervals,
    wherein the setting a partial frequency band includes setting at least one interval among the plurality of intervals as the transmission frequency band, and the varying the transmission frequency band includes changing the interval set to the transmission frequency band among the plurality of intervals according to the triggering event.

7. The method of claim 1, wherein
    the setting a partial frequency band includes setting the transmission frequency band by applying a low pass filter in which a first interruption frequency is set in the entire service frequency band, and when the traffic amount of the customer premise device increases to satisfy the triggering event, the varying the transmission frequency band includes increasing the size of the transmission frequency band by increasing the first interruption frequency to a second interruption frequency which is a high frequency.

8. The method of claim 1, wherein: the varying the transmission frequency band includes varying the transmission frequency band within the entire service frequency band upon the occurrence of the triggering event including changes in usage states and data traffic amounts of adjacent subscriber lines, and varying a transmission signal strength according to the traffic of the customer premise device, the usage states and data traffic amounts of adjacent subscriber lines, and a varying operation of the transmission frequency band.

9. A method for controlling transmission for subscriber lines of a plurality of customer premise devices by a transmission control apparatus in an access network structure in which at least one network management device and a plurality of customer premise devices are connected through a bundle cable including a plurality of subscriber lines, the method comprising:
    receiving a network resource request from each of the plurality of customer premise devices;
    setting a transmission frequency band for each of the plurality of customer premise devices, and
    varying a transmission frequency band of a target customer premise device in the entire service frequency band when a frequency band change event occurs in the target customer premise device among the customer premise devices,
    wherein the transmission frequency band of each customer premise device is a partial frequency band in an entire service frequency band and traffic of each customer premise device is transmitted and received in the corresponding transmission frequency band,
    wherein the varying the transmission frequency band includes:

varying a size of the transmission frequency band within the entire service frequency band upon changes in usage states of an adjacent subscriber line.

10. The method of claim 9, wherein:
the varying a transmission frequency band includes increasing a size of the transmission frequency band by increasing an interruption frequency of a low pass filter set in the entire service frequency band when a traffic amount of the target customer premise device increases to satisfy the frequency band change event.

11. The method of claim 9, wherein: the varying a transmission frequency band includes determining the transmission frequency band of the target customer premise device by referring to a transmission frequency band allocated to an adjacent subscriber line of the target customer premise device.

12. The method of claim 9, wherein:
the setting a transmission frequency band includes setting the same transmission frequency band to each of the plurality of customer premise devices.

13. The method of claim 9, wherein the setting a transmission frequency band includes determining the transmission frequency band of each customer premise device based on a frequency band allocation criterion corresponding to each of the plurality of customer premise devices, and
the frequency band allocation criterion includes at least one of a contract transmission speed, a subscriber line state, and a traffic amount of each customer premise device.

14. An apparatus for controlling traffic transmission for a subscriber line of a customer premise device, the apparatus comprising:
a memory; and
a processor performing a traffic transmission control operation by executing an instruction stored in or loaded to the memory,
wherein the processor performs
setting a partial frequency band in an entire service frequency band provided by the subscriber line as a transmission frequency band of the customer premise device when receiving a network resource request of the customer premise device, and
varying the transmission frequency band in the entire service frequency band when a triggering event occurs, and
traffic of the customer premise device is transmitted and received in the transmission frequency band,
wherein the varying the transmission frequency band includes:
varying a size of the transmission frequency band within the entire service frequency band upon the occurrence of the triggering event including changes in usage states of an adjacent subscriber line.

15. The apparatus of claim 14, wherein:
the processor sets the transmission frequency band by applying a low pass filter in which a first interruption frequency is set in the entire service frequency band in the setting, and increases, when a traffic amount of the customer premise device increases to satisfy the triggering event, a size of the transmission frequency band by increasing the first interruption frequency to a second interruption frequency which is a high frequency in the varying.

16. The apparatus of claim 14, wherein:
the processor obtains a default frequency band of the customer premise device based on a default transmission frequency band for each contract transmission speed and sets the obtained default frequency band in the customer premise device, in the setting.

17. The apparatus of claim 14, wherein:
the processor, further performs varying a transmission signal strength according to at least one of the traffic of the customer premise device, a usage state of an adjacent line, and a varying operation of the transmission frequency band.

* * * * *